United States Patent
Sekino et al.

(10) Patent No.: US 9,956,929 B2
(45) Date of Patent: May 1, 2018

(54) POWER SUPPLY DEVICE

(71) Applicant: Yazaki Corporation, Tokyo (JP)

(72) Inventors: Tsukasa Sekino, Makinohara (JP);
Hiroshi Yamashita, Makinohara (JP);
Hiroaki Watanabe, Makinohara (JP)

(73) Assignee: Yazaki Corporation, Tokyo (JP)

( * ) Notice: Subject to any disclaimer, the term of this patent is extended or adjusted under 35 U.S.C. 154(b) by 125 days.

(21) Appl. No.: 14/802,147

(22) Filed: Jul. 17, 2015

(65) Prior Publication Data

US 2015/0321626 A1 Nov. 12, 2015

Related U.S. Application Data

(63) Continuation of application No. PCT/JP2014/050927, filed on Jan. 20, 2014.

(30) Foreign Application Priority Data

Jan. 22, 2013 (JP) ................. 2013-009138

(51) Int. Cl.
  *B60R 16/02* (2006.01)
  *B60R 16/027* (2006.01)
  *H02G 11/00* (2006.01)
(52) U.S. Cl.
  CPC ........ *B60R 16/0215* (2013.01); *B60R 16/027* (2013.01); *H02G 11/00* (2013.01)
(58) Field of Classification Search
  CPC .................................................. B60R 16/0215

(Continued)

(56) References Cited

U.S. PATENT DOCUMENTS 7,442,884 B2 * 10/2008 Ball .................... H02G 15/013
  16/2.1
2004/0233797 A1 * 11/2004 Obata ................ G11B 23/0308
  369/30.03

(Continued)

FOREIGN PATENT DOCUMENTS

EP  2876763 A1  5/2015
JP  2007-151377 A  6/2007

(Continued)

OTHER PUBLICATIONS

International Search Report dated Apr. 1, 2014, issued for PCT/JP2014/050927.

(Continued)

*Primary Examiner* — Hoa C Nguyen
*Assistant Examiner* — Stanley Tso
(74) *Attorney, Agent, or Firm* — Locke Lord LLP

(57) ABSTRACT

A power supply device includes: a rotary member that holds a wire harness inserted therethrough; and a support member that swingably supports the rotary member and is fixed to a fixed structure body or a sliding structure body, wherein the rotary member has an annular outer peripheral wall and a harness lead-out portion, the support member has one sidewall disposed along the outer peripheral wall, and the harness lead-out portion moves in a direction away from the sidewall when the sliding structure body is fully opened, the outer peripheral wall is widely exposed between the harness lead-out portion and the sidewall, and the outer peripheral wall and the sidewall are overlapped with each other in a plate thickness direction in a state where the outer peripheral wall is widely exposed and come in contact with each other so as to avoid an entry of foreign matters therebetween.

9 Claims, 8 Drawing Sheets

(58) Field of Classification Search
USPC ........................................................ 174/72 A
See application file for complete search history.

(56) References Cited

U.S. PATENT DOCUMENTS

| | | | |
|---|---|---|---|
| 2007/0084619 A1 | 4/2007 | Kisu et al. | |
| 2009/0121093 A1* | 5/2009 | Murayama .......... | B60R 16/0215 248/70 |
| 2009/0140107 A1* | 6/2009 | Murayama .......... | B60R 16/0215 248/60 |
| 2010/0026043 A1 | 2/2010 | Shima et al. | |

FOREIGN PATENT DOCUMENTS

| | | |
|---|---|---|
| JP | 2008-189112 A | 8/2008 |
| JP | 2011-024421 A | 2/2011 |
| WO | 2012/070673 A1 | 5/2012 |

OTHER PUBLICATIONS

Supplementary European Search Report dated Jul. 21, 2016, issued for European patent application No. 14743375.9.

* cited by examiner

POWER SUPPLY DEVICE

TECHNICAL FIELD

The present invention relates to a power supply device which is mounted on, for example, a vehicle body or a sliding door of an automobile to swingably support a wire harness.

BACKGROUND ART

Conventionally, various power supply devices have been proposed to constantly supply power to a sliding door for an automobile, and, in particular, a power supply device for the purpose of compactness or the like is known which allows a wire harness for power supply to rotate in a horizontal direction using a swinging member according to opening and closing of a sliding door.

For example, Patent Literature 1 (not illustrated) discloses a power supply device which, on a sliding door side, includes a fixing member which is formed in a substantially U-shaped cross-section with an upper wall, a rear wall, and a lower wall and is fixed to the sliding door and a swing member which is pivotally supported on the upper wall and the lower wall of the fixing member in a horizontal direction and is configured to bend and insert a wire harness to the fixing member and the swing member and thus to arrange the wire harness on a vehicle body side.

In addition, Patent Literature 2 (not illustrated) discloses a power supply device in which substantially bracket-shaped support members are provided on a vehicle body and a sliding door side, respectively; substantially rectangular cylindrical rotary members are rotatably (swingably) connected to the support members in a horizontal direction, respectively; substantially rectangular cylindrical protectors are rotatably (swingably) connected to the rotary member in a horizontal direction, respectively; arc-shaped protrusions are provided on the protectors at side ends of connection portions between the rotary member and the protectors; and a cover overlapped with an outer side of the protrusion provided on the protector is provided on the rotary member, thereby preventing a wire harness from being exposed from the connection portions.

CITATION LIST

Patent Literature

Patent Literature 1: JP 2007-151377 A (FIGS. 1 and 2)
Patent Literature 2: JP 2008-189112 A (FIGS. 1, 5, and 7)

SUMMARY OF INVENTION

Technical Problem

In the power supply device on the sliding door side disclosed in Patent Literature 1, however, there was a concern that swing operation of the swing member was hindered when relatively large foreign matters such as stone or pen are nipped between the swing member and the rear wall of the fixing member. In addition, there was a concern that the swing operation of the swing member was not smoothly performed when foreign matters such as dust, sand, or water enter between a lower shaft portion of the swing member and a bearing portion of the lower wall of the fixing member.

Furthermore, in the power supply device on the vehicle body side disclosed in Patent Literature 2, there was a concern that swing operation of the rotary member was hindered when the foreign matters such as stone or pen are nipped between the support member fixed to, for example, the vehicle body side and the rotary member swingably and pivotally supported on the support member in a state where the sliding door is fully opened by sliding to the back side of the vehicle. In addition, when the sliding door is fully opened, a large rotational gap was caused between the support member fixed to the vehicle body side and the rotary member and thus there was a concern that an appearance was decreased as seen by a person who is to get in the vehicle.

In addition, since a slight gap is caused between the tip of the cover of the rotary member and the tip of the protrusion of the protector when the sliding door is fully opened, there was a concern that the foreign matters such as sand, dust, or water entered into the rotary member from the gap. In addition, there was a concern that the foreign matters such as dust, sand, or water entered into the pivotally supported lower portion of the rotary member and the protector from the outside.

In consideration of the above problems, an object of the present invention is to provide a power supply device which is provided with a support member fixed to a vehicle body side or a sliding door side and a rotary member swingably and pivotally supported on the support member and which can prevent a decrease in appearance between the support member and the rotary member and the entry of foreign matters such as stone, pen, or sand from entering between the support member and the rotary member and can further prevent foreign matters such as dust, sand, or water from entering to a pivotally supported lower portion or the like of the rotary member from the outside, when the sliding door is fully opened, for example.

Solution to Problem

In order to achieve the above object, a power supply device according to one aspect of the present invention of the present invention is characterized by including: a rotary member that holds a wire harness inserted therethrough; and a support member that swingably supports the rotary member and is fixed to a fixed structure body or a sliding structure body, wherein the rotary member has an annular outer peripheral wall and a harness lead-out portion, the support member has one sidewall disposed along the outer peripheral wall, and the harness lead-out portion moves in a direction away from the sidewall when the sliding structure body is fully opened, the outer peripheral wall is widely exposed between the harness lead-out portion and the sidewall, and the outer peripheral wall and the sidewall are overlapped with each other in a plate thickness direction in a state where the outer peripheral wall is widely exposed and come close to or come in contact with each other, so that foreign matters are prevented from entering between the outer peripheral wall and the sidewall.

According to the above configuration, since the annular outer peripheral wall of the rotary member and one sidewall of the support member are overlapped (wrapped) with each other in a plate thickness direction when the sliding structure body (sliding door) is fully opened and the outer peripheral surface of the outer peripheral wall and an inner surface or an inner end of the sidewall come close to or come in weakly contact (in a contact pressure not hindering the rotation of the rotary member) with each other with a slight gap, the entry or nipping of stone, sand, or the like between the one sidewall and the outer peripheral wall is prevented and a deep side of the one sidewall and the outer peripheral wall is not seen, that is, the fixed structure body (vehicle body) side is not visually seen (deterioration in appearance) from the sliding structure body side or the sliding structure body side is not visually seen (deterioration in appearance) from the fixed structure body side. The other sidewall of the support member does not have to come close to the rotary member as much as the one sidewall. The support member is made up of the base member and the cover member. The outer peripheral wall having substantially an annular shape includes the substantially annular outer peripheral wall.

A power supply device according to a first preferred aspect of the present invention is characterized in that: in the power supply device according to the one aspect of the present invention, a first annular rib is provided on a lower end side of the rotary member, a second annular rib is provided in the support member to come close to an outer side and/or an inner side of the first rib, and a labyrinth structure is formed with the first rib and the second rib to prevent the entry of the foreign matters.

According to the above configuration, a labyrinth structure having a cross-section of a rectangular wave shape is formed with the first annular rib of the rotary member and the second annular rib of the support member and the foreign matters such as dust, sand, or water are prevented from entering to an inner lower portion of the rotary member, that is, pivotally supported portion from the outside. The number of ribs can be appropriately set, respectively. Each of the ribs is disposed on the outer periphery side of the rotary member or disposed closer to the pivotally supported central portion and may be disposed both on the outer periphery side of the rotary member and be disposed closer to the pivotally supported central portion. For example, each of the ribs is preferably disposed concentrically with the shaft portion of the rotary member.

A power supply device according to a second preferred aspect of the present invention is characterized in that: in the power supply device according to the first preferred aspect of the present invention, the first and second ribs are disposed around a lower pivotally supported portion of the rotary member.

According to the above configuration, the first annular rib is disposed near (around) the pivotally supported portion (for example, shaft portion) of the rotary member, the second annular rib is disposed near (around) the pivotally supported portion (for example, bearing portion) of the support member, the labyrinth structure having the cross-section of the rectangular wave shape is formed near the pivotally supported portion with both of the ribs, and thus the entry of the foreign matters such as dust, sand, or water to the pivotally supported portion is reliably prevented. The number of ribs can be appropriately set, respectively. For example, each of the ribs is preferably disposed concentrically with the shaft portion of the rotary member.

A power supply device according to a third preferred aspect of the present invention is characterized in that: in the power supply device according to any of the one aspect to the second preferred aspect of the present invention, a sub-body portion is disposed on an inner side of the outer peripheral wall of the rotary member to form the harness lead-out portion and the wire harness is inserted into the sub-body portion.

According to the above configuration, the outer peripheral wall of the rotary member (main body portion) is disposed outside the sub-body portion, the wire harness inserted along the inner surface of the sub-body portion is doubly protected by the outer peripheral wall, and the insertion portion of the wire harness is not visually seen by the peripheral wall from the outside.

A power supply device according to a fourth preferred aspect of the present invention is characterized in that: in the power supply device according to the third preferred aspect of the present invention, the sub-body portion is locked to the rotary member with a locking means in the inner side of the outer peripheral wall.

According to the above configuration, for example, since the locking means such as a locking claw portion of the rotary member (main body portion) and an engagement frame portion of the sub-body portion is covered and hidden by the outer peripheral wall of the rotary member (main body portion), the appearance from the outside is improved.

Advantageous Effects of Invention

According to the one aspect of the present invention, even when the foreign matters such as stone or sand try to enter between the outer peripheral wall of the rotary member and one sidewall of the support member when, for example, the sliding door of the vehicle is fully opened, since the outer peripheral wall and the sidewall are wrapped in the plate thickness direction and come close to or come in contact with each other without a harmful gap, the nipping of the foreign mattes between the outer peripheral wall and the sidewall and the hindrance of the swing operation of the rotary member associated with the nipping are prevented, thereby improving reliability of normal power supply from the vehicle body to the sliding door. In addition, since the outer peripheral wall of the rotary member and one sidewall are wrapped in the plate thickness direction when the sliding door is fully opened and thus the gap is completely eliminated when viewed from the outside, the appearance is improved and thus the power supply device and the vehicle equipped with the power supply device can be improved in design.

According to the first preferred aspect of the present invention, the labyrinth structure having the cross-section of the rectangular wave shape is configured by the first annular rib of the rotary member and the second annular rib of the support member, and thus it is possible to prevent the foreign matters such as dust, sand, or water from entering to the inner lower portion of the rotary member, that is, toward the pivotally supported portion from the outside. Thus, the swing operation of the rotary member is smoothly performed over a long period, thereby improving reliability of normal power supply.

According to the second preferred aspect of the present invention, the labyrinth structure is formed with the first rib and the second rib near the pivotally supported portion of the rotary member, so that the foreign matters such as dust, sand, or water can be reliably prevented from entering to the pivotally supported portion from the outside and the swing operation of the rotary member can be further smoothly performed over a long period.

According to the third preferred aspect of the present invention, the sub-body portion for harness insertion (guide) is disposed inside the outer peripheral wall of the rotary member, so that the wire harness inserted into the sub-body portion can be doubly protected by the outer peripheral wall and thus can be safely protected from the interference with the outside and that the wire harness in the rotary member cannot be visually seen, thereby improving the appearance.

According to the fourth preferred aspect of the present invention, the locking means between the rotary member and the sub-body portion is hidden by the outer peripheral wall of the rotary member, so that the appearance from the outside can be improved and thus design of the power supply device and the vehicle equipped with the power supply device can be improved.

DESCRIPTION OF EMBODIMENTS

FIGS. 1 to 5 are diagrams illustrating a first embodiment of a power supply device according to the present invention. The power supply device is mounted on a vehicle body side of an automobile.

Figure 1:
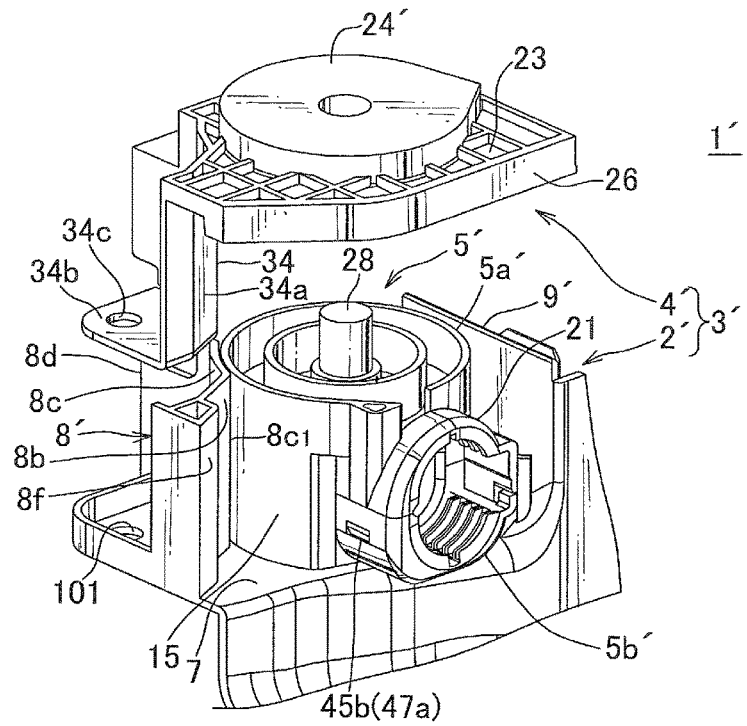
FIG. 1 illustrates a power supply device according to a first embodiment of the present invention and is an exploded perspective view illustrating one form of the power supply device on a vehicle body side.

As illustrated in FIG. 1, such a power supply device 1' includes a synthetic resin-made base member 2', a synthetic resin-made cover member 4' which is disposed on an upper side of the base member 2', a synthetic resin-made rotary member 5' swingably assembled between the base member 2' and the cover member 4' in a circumferential direction (horizontal direction). A support member 3' is configured by the base member 2' and the cover member 4' with respect to the rotary member 5'.

The base member 2' includes a horizontal board portion 7 and each of sidewalls 8' and 9' erected on the front and the back of the board portion 7, the front sidewall 8' includes a curved wall 8c which comes close to (possibly, comes in weakly contact with) an outer peripheral surface of a circular annular (approximately annular) outer peripheral wall 15 of the rotary member 5' with a slight (marginal) gap, a board wall 8b which continuous with a left side of the curved wall 8c and is inclined forward, a block wall 8f which is continuous with a left end of the board wall 8b and is used for a stopper of the rotary member, and a back wall 8d which is continuous with a right from the curved wall 8c. The back sidewall 9' comes close to the outer peripheral wall 15 of the rotary member 5', but is not as much as the front sidewall 8'.

The curved wall 8c of the front sidewall 8' is formed concentrically with the outer peripheral wall 15 and a central shaft portion (an upper shaft portion 28 and a lower shaft portion 11 in FIG. 2) of the rotary member 5', an inner curved surface comes close along (comes in contact with) the outer peripheral surface of the outer peripheral wall 15 of the rotary member 5' with a slight gap, one side end (left end) 8$c_1$ of the curved wall 8c intersects with the left board wall 8d at an obtuse angle with an edge. By the curved wall 8c and the board wall 8b, the gap between the front sidewall and the outer peripheral wall 15 of the rotary member 5' is eliminated as much as possible (so as not to contact with the outer peripheral wall 15) and thus the entry, that is, nipping relatively large foreign matters such as stone or pen between the front sidewall 8' and the rotary member 5' is prevented or the entry of small foreign matters such as sand is prevented.

Figure 4:
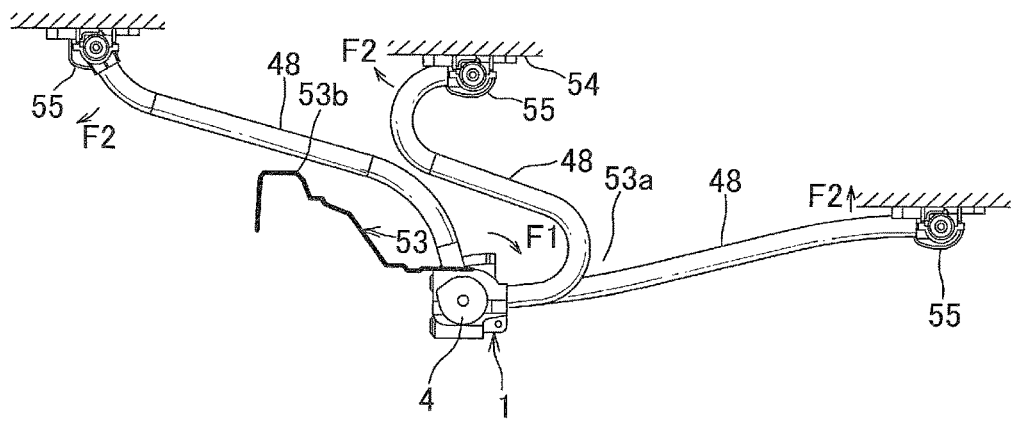
FIG. 4 is a plane view illustrating an operation of a wire harness between a vehicle body side and a power supply device and between a sliding door side and a power supply device every time the sliding door is opened and closed.
Figure 5A:
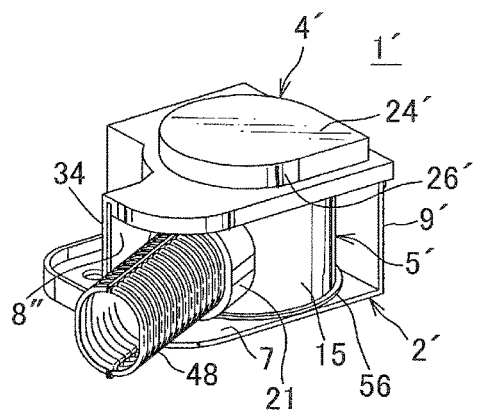
FIG. 5A is a perspective view illustrating an operation of the power supply device on the vehicle body side when the sliding door is fully closed.
Figure 5B:
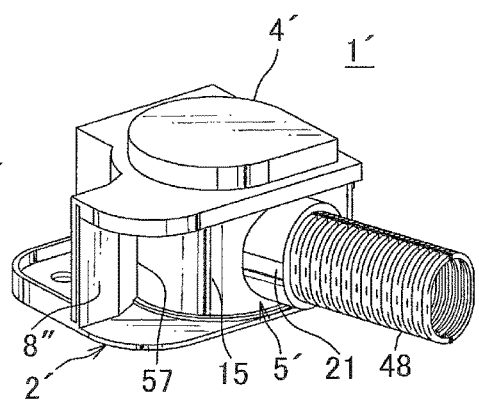
FIG. 5B is a perspective view illustrating an operation of the power supply device on the vehicle body side when the sliding door is fully opened.

The power supply device 1' is disposed below an entrance 53a of a vehicle body 53 corresponding to a sliding door 54 on a left side of the vehicle in FIG. 4, the rotary member 5' rotates (swings) to a back side of the vehicle as illustrated in FIGS. 1 and 5B in a state where the sliding door 54 is fully opened by sliding to the back side of the vehicle, and the outer peripheral wall 15 is exposed to the front side in a large area compared to a harness lead-out wall (harness lead-out portion) 21 protruding to a left side (sliding door side) from the outer peripheral wall 15 of the rotary member 5', so that the gap is prevented from being formed between the outer peripheral wall 15 and the front sidewall 8' and a deep side portion (right half portion; not illustrated) of the harness lead-out wall 21 or an inner portion of the vehicle body 53 on a deep side of the rotary member 5' is hidden by the outer peripheral wall 15 having the large exposed area and thus being seen by a person who tries to get in the vehicle, thereby improving the appearance.

As illustrated in the left side of FIGS. 4 and 5B, since a wire harness (illustrating a corrugated tube on an outer periphery of the wire harness) 48 lead out from the harness lead-out wall 21 of the rotary member 5' is arranged toward the back side of the vehicle when the sliding door 54 is fully opened, for example, although there is a large gap between the rotary member 5' and the front sidewall 8', as illustrated in FIG. 1, the annular outer peripheral wall 15 suppresses the gap with the sidewall 8' without being hidden by the wire harness 48 and thus is effective in preventing the entry of the foreign matters such as stone, pen, sand and also improving the appearance from the outside. The outer peripheral wall 15 of the rotary member 5' is also called an appearance wall. In the description, further, directions of front, back, right, left, up and down coincide with directions of the vehicle.

As illustrated in FIG. 1, the upper cover member 4' includes a horizontal upper wall 23, a convex wall portion (convex portion) 24' protruding upward from the upper wall 23, a vertically downward flange portion 26 provided on the periphery of the upper wall 23, and a sidewall 34 provided downward from the front side of the upper wall 23. The sidewall 34 includes a vertical wall portion 34a and a horizontal flange wall 34b provided downward at a lower end of the vertical wall portion 34a, the vertical wall portion 34a is positioned in contact with the outer surface of the front sidewall 8' of the base member 2' (the inner surface of the sidewall 34 is formed in a shape along the outer surface of the sidewall 8'), and a bolt or a locking clip (both are not illustrated) is inserted into a hole 34c on the flange wall 34b and a front hole 101 on the board portion 7 of the base member 2' and thus is fastened together and firmly fixed to the vehicle body 53. The flange portion 26 provided on the outer periphery of the upper wall 23 of the cover member 4' comes in contact with the outer surface of the upper end of the front and back sidewalls 8' and 9' of the base member 2', so that the front and back sidewalls 8' and 9' are connected to each other by the upper wall 23.

Figure 2:
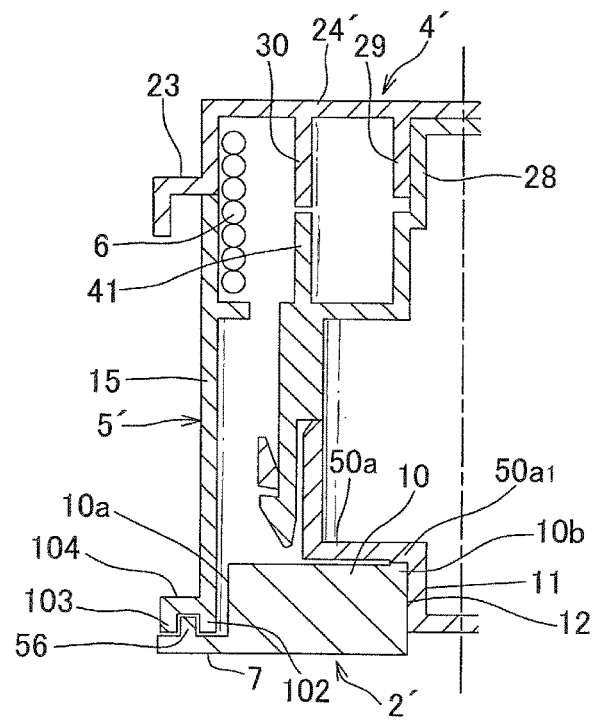
FIG. 2 is a longitudinal cross-sectional view illustrating main portions of the power supply device, similarly.

As illustrated in FIG. 2, an upper half of an annular torsion coil spring (spring member) 6 is housed inside the convex portion 24' on the upper wall 23 of the cover member 4' and a lower half of the torsion coil spring 6 is housed in the upper portion of the rotary member 5', and thus rotary member 5' is biased to the front side of the vehicle, as indicated by the arrow F1 in FIG. 4, by the torsion coil spring 6. In an inner side of the torsion coil spring 6 in a radial direction, annular partition walls 30 and 41 are provided on the cover member 4' and the upper portion of the rotary member 5' to face each other in a vertical direction, respectively, and the upper shaft portion 28 of the rotary member 5' and a cylindrical bearing wall (bearing portion) 29 for housing the shaft portion 28 are concentrically provided inside the partition walls 30 and 41.

A bearing hole (bearing portion) 12 is provided in one-step higher disc portion 10 on the substantially central portion of the board portion 7 of the base member 2' and is engaged with the lower shaft portion 11 of the rotary member 5'. Each of vertically annular inner/outer ribs (first rib) 102 and 103 having an inverse U-shaped cross-section and an upper flange wall 104 for connecting the ribs 102 and 103 to each other are provided at a lower end side of the outer peripheral wall 15 of the rotary member 5', the inner rib 102 is positioned on the same vertical plane as the outer peripheral wall 15 to form the lower end portion (a part) of the outer peripheral wall 15, the flange wall 104 protrudes outward from the outer peripheral wall 15, and the outer rib 103 is suspended in parallel with the inner rib 102 from the protruding tip of the flange wall 104.

In addition, an annular rib (second rib) 56 is formed to protrude upward on the horizontal board portion 7 of the base member 2' and is engaged with an annular groove portion between the ribs 102 and 103 provided at the lower end of the outer peripheral wall 15 of the rotary member 5' with a slight gap, a labyrinth structure having a cross-section of a rectangular wave shape is formed by each of the ribs 56, 102, and 103. By this labyrinth structure, the small foreign matters such as dust, sand, or water is prevented from entering into the lower inner side of the rotary member 5', that is, the lower shaft portion 11 of the rotary member 5' and the bearing hole 12 of the base member 2' from the outside, and thus the sliding contact between the shaft portions 11 and 12 is smoothly performed over a long period. Since the disc portion 10 is positioned one-step higher inside the labyrinth structures 56, 102, and 103, the labyrinth structures are promoted even by an outer peripheral surface 10a of the disc portion 10 and thus the entry of the small foreign matters is reliably prevented. The outer peripheral surface 10a of the disc portion 10 also forms some of ribs of the labyrinth structure.

The lower shaft portion 11 of the rotary member 5' is orthogonal to a bottom wall 50a of the rotary member 5', a part of the bottom wall 50a protrudes downward in an annular shape around the shaft portion 11 to form a sliding portion $50a_1$, and the sliding portion $50a_1$ comes in contact with an annular seat portion (seat surface) 10b, which is provided one-step higher at an upper edge of the bearing hole 12 on the disc portion 10 of the base member 2', and slides in a rotational direction. The central rib 56 comes close to (possibly, comes in weakly contact with) the inner/outer ribs 102 and 103 with the slight gap, resulting in reducing rotation resistance of the rotary member 5'.

Figure 3:
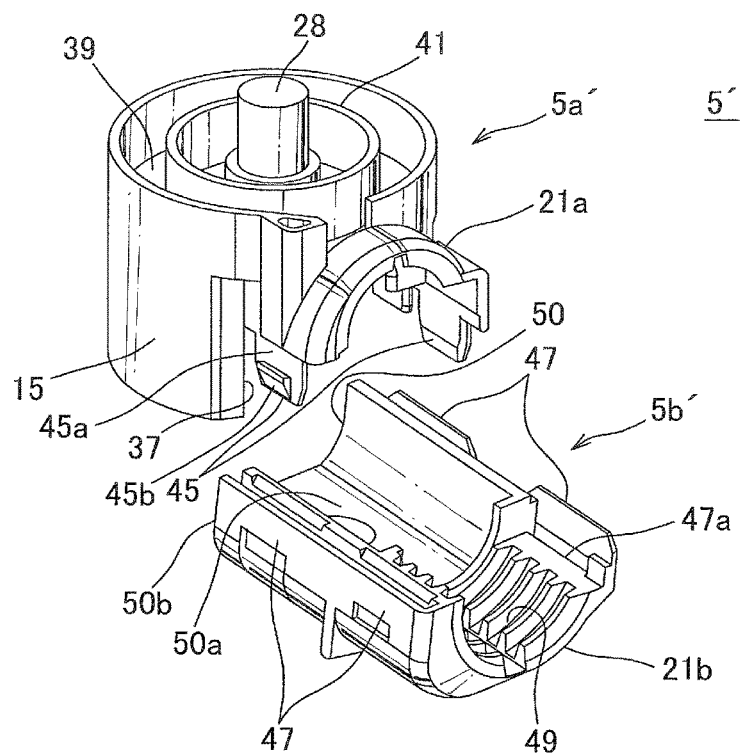
FIG. 3 is an exploded perspective view illustrating one form of a rotary member of the power supply device, similarly.

As illustrated in FIGS. 1 and 3, the rotary member 5' is made up of a main body portion (upper member) 5a' and a sub-body portion (lower member) 5b' and the main body portion 5a' and the sub-body portion 5b' are fixed to each other by locking means 45 and 47. As illustrated in FIG. 3, the main body portion 5a' includes a circular and annular (correctly, a lower half thereof has an arc shape in which openings 37 and 38 for harness insertion (see FIG. 8) are provided on right and left sides and an upper half has a circular and annular shape) outer peripheral wall 15, a horizontal upper wall 39 provided at the upper portion of the outer peripheral wall 15, an upper shaft portion 28 provided at the center of the upper wall 39, an annular partition wall 41 around the shaft portion 28, an opening (only left opening is illustrated) 37 for harness lead out provided at both right and left sides of the outer peripheral wall 15, a harness lead-out wall 21a of a half-split shape (semi-circular cross-section) protruding outward from the left opening 37, a pair of front and back claw portions 45 for locking provided at a lower end of the harness lead-out wall 21a, and a pair of front and back claw portions (not illustrated) provided inside of the outer peripheral wall 15. In this example, a total of four locking claw portions 45 are disposed at right and left and front and back and each of the claw portions 45 is made up of a support piece 45a and a projection 45b projected to the outer surface of the support piece 45a.

The sub-body portion 5b' of the rotary member 5' is formed in a substantially U-shaped cross-section by the horizontal bottom wall 50a and a substantially vertical sidewall 50b on both front and rear sides of the bottom wall 50a and includes a harness lead-out wall 21b of a half-split shape (inner peripheral surface has a semi-circular cross-section), which is provided at the tip (left end) side thereof and faces the harness lead-out wall 21a of the main body portion 5a', and a gutter-like harness lead-out wall 50 which is provided at the middle side and a proximal end (right end) side thereof. A plurality of ribs 49 are provided in parallel on the inner peripheral surface of each of the harness lead-out walls 21a and 21b, which is provided at the tip, to hold a corrugated tube 48 (see FIGS. 5A and 5B) for the wire harness. Both of the harness lead-out walls 21a and 21b of the half-split shape are joined to each other to constitute the harness lead-out wall (harness lead-out portion) 21 of an annular cross-section illustrated in FIG. 1.

Each of frame portions 47 (having an opening into which the claw portion is inserted), which is formed upward at front and back and right and left, is integrally provided on both of the sidewalls 50b of the sub-body portion 5b' to be engaged with each of the claw portions 45 of the main body portion 5a and on the same plane as the outer surface of the sidewall 50b, the claw portion 45 enters into the inside of the frame portion 47, the projection 45b of the claw portion 45 is engaged with a hole 47a of the frame portion 47 from the inside, and thus most of the claw portion 45 is not seen in this state from the outside (only the projection 45b engaged with the hole 47a of the frame portion 47 is exposed, but the boundary between the hole 47a and the projection 45b may not be discriminated unless observed carefully).

Thus, for example, even if the rotary member 5' is seen from the outside by a person who tries to get in the vehicle when the sliding door 54 (see FIG. 4) is fully opened, the appearance is not impaired by the locking means 45 and 47 and accordingly the locking means 45 and 47 are also called an appearance lock. The locking means 45 and 47 not only improve the appearance but also are resistant to interference from the outside, so that there is no concern that the locked state is unexpectedly released even when the interference with the outside takes places. The locking means 45 and 47 disposed inside the outer peripheral wall 15 of the rotary member 5' are much less likely to interfere with the outside and there are no concerns of the unexpected release and the disengagement (split) of the rotary member 5' associated with the release of the locked state.

In FIG. 3, since three frame portions 47 other than the frame portion 47 on the tip-back-side of the sub-body portion 5b' are configured such that a claw portion inserting gap is provided at the middle in a plate thickness direction of the sidewall 50b (the sidewall 50b is partially formed with double walls) and that the claw portion 45 is inserted into the sidewall 50b, the interference between the wire harness 48 (see FIGS. 5A and 5B) to be inserted into the harness lead-out wall 21 and the locking means 45 and 47 is also prevented.

FIG. 4 illustrates a state where the power supply device 1' is mounted on the bottom of an entrance 53a of a vehicle body 53 and a wire harness with the corrugated tube 48 is horizontally arranged from the power supply device 1' to a power supply device 55 to be described below of a sliding door 54 on a left side of the vehicle, and the right side (front side of the vehicle), the center, and the left side (back side of the vehicle) of FIG. 4 illustrate a fully closed state, a half-opened state, and a fully opened state of the sliding door with a solid line for convenience, respectively.

FIG. 5A illustrates a fully closed state of a sliding door of a power supply device on the vehicle body side as viewed from the left side (sliding door side) of the vehicle, and similarly, FIG. 5B illustrates a fully opened state of the sliding door of the power supply device as viewed from the left side (sliding door side) of the vehicle. A front sidewall 8" of the power supply device 1' illustrated in FIGS. 5A and 5B is a little different from that of FIG. 1. In addition, the illustration (configuration) of the lower outer peripheral rib 103 and the flange wall 104 in the rotary member is omitted.

As illustrated in the right side of FIGS. 4 and 5A, when the sliding door 54 is fully closed, the torsion coil spring (spring member) 6 of the power supply device 1' on the vehicle body side is provided integrally with the rotary member 5 to bias the wire harness (substituted by reference numeral 48) in a clockwise direction (in a closing direction of the sliding door and toward the inside of the vehicle body 53) as indicated by an arrow F1, so that the wire harness 48 is forward pulled and extends toward the power supply device 55 on the sliding door side in a state of an approximate straight line along the vehicle body 53 without protruding to the outside (sliding door side) from the vehicle body 53. Further, the wire harness is actually made up of the corrugated tube 48 and a plurality of electric wires inserted into the corrugated tube.

Then, as illustrated in the center of FIG. 4, when the sliding door 54 is half-opened, the wire harness 48 is biased by the torsion coil spring 6 of the power supply device 1' on the vehicle body side in the closing direction of the sliding door and toward the inside of the vehicle as indicated by the arrow F1, so that the wire harness is smoothly bent in a substantially S-shape without being buckled and an excessive length of the harness is absorbed.

Furthermore, as illustrated in the left side of FIGS. 4 and 5B, when the sliding door 54 is fully opened, the torsion coil spring 6 of the power supply device 1' on the vehicle body side is provided integrally with the rotary member 5 to bias the wire harness 48 in the closing direction of the sliding door as indicated by an arrow F1, so that the wire harness portion 48 led out from the power supply device 1' on the vehicle body side is separated forward from a portion (a portion protruding toward the outside of the vehicle) 53b on the back end side of the entrance 53a of the vehicle body 53 and thus is prevented from the interference with the protruding portion 53b on the back end side of the entrance of the vehicle body 53.

As illustrated in FIG. 5B, since the electric wire portion of the wire harness 48 is inserted and housed into/in the outer peripheral wall 15 of the rotary member 5 in the power supply device 1', the appearance from the outside is favorable, and since the gap 57 between the outer peripheral wall 15 of the rotary member 5 and the front sidewall 8" of the base member 2' is suppressed to be made small, there is no concern that the foreign matters enter into the gap 57.

FIGS. 6 to 10 illustrate a power supply device according to a second embodiment of the present invention. The power supply device is similar to the power supply device illustrated in FIGS. 1 to 3 and is disposed on a vehicle body side of an automobile. The same components as the power supply device illustrated in FIGS. 1 to 3 will be denoted and described by the same reference numerals.

Figure 6:
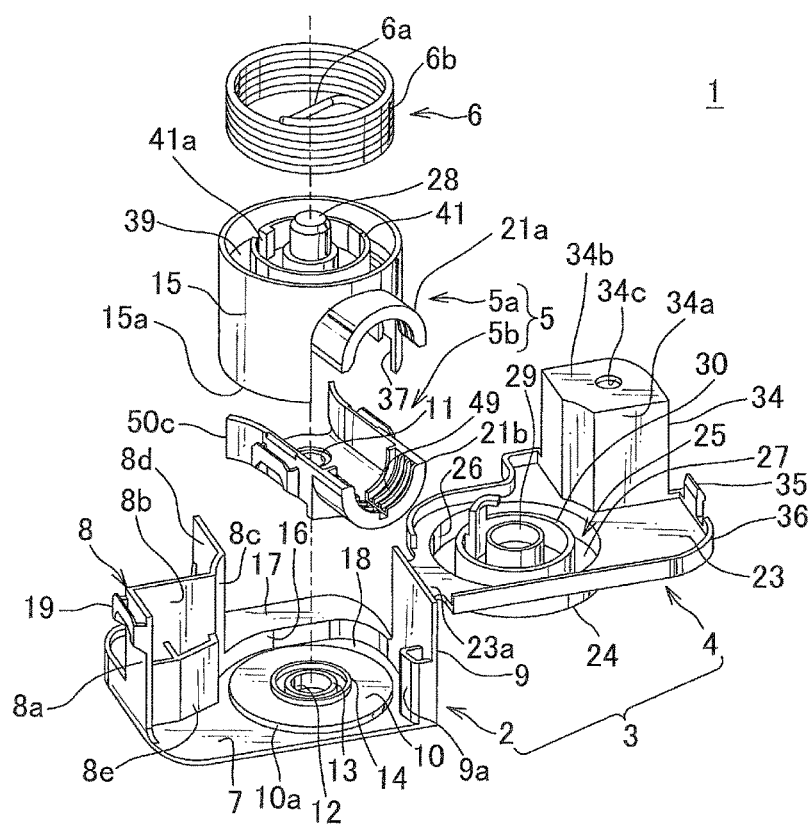
FIG. 6 illustrates a power supply device according to a second embodiment of the present invention and is an exploded perspective view illustrating another form of the power supply device on a vehicle body side.
Figure 7:
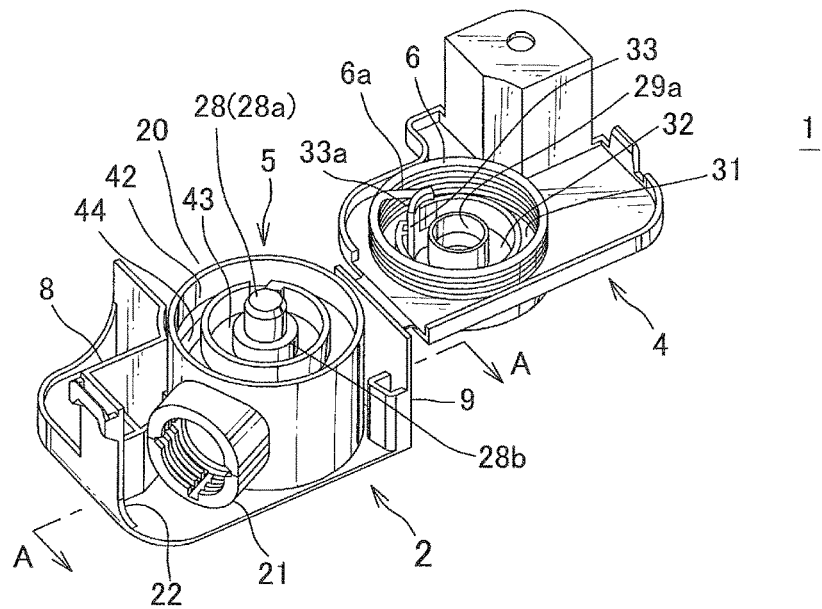
FIG. 7 is a perspective view illustrating a state in the middle of assembly of the power supply device, similarly.

As illustrated in FIGS. 6 and 7, such a power supply device 1 includes a synthetic resin-made base member 2, a synthetic resin-made cover member 4 which is openably and closably connected to an upper portion of the base member 2 by a flexible thin hinge (hinge) 23a, a synthetic resin-made rotary member 5 as a swinging member swingably disposed between the base member 2 and the closed-state cover member 4 in a horizontal direction, and a metallic annular torsion coil spring (spring member or spring portion) 6 disposed between an upper portion of the rotary member 5 and the cover member 4.

The base member 2 includes a horizontal board portion 7 and each of sidewalls (wall portions) 9 erected on the front and the back of the board portion 7, a circular projecting wall portion (disc portion) 10 is provided on an upper surface of the board portion 7 between both of the sidewalls 8 and 9, a circular bearing hole 12 supporting a lower side-central shaft portion 11 (see FIG. 8) of the rotary member 5 is provided to be penetrated through a center of the disc portion 10, a circular annular small-diameter rib 13 is provided on an upper edge of a bearing hole 12, and a circular and annular large-diameter rib 14 is concentrically provided around the rib 13.

The front sidewall 8 of the base member 2 is bent in a substantially crank shape when viewed from the plane and includes a vertical front end wall 8a, a vertical intermediate wall 8b substantially orthogonal to the front end wall 8a, a vertical curved wall 8c being continuous with the intermediate wall 8b, a vertical back wall 8d being continuous with the curved wall 8c and disposed stepwise in substantially parallel with the front end wall 8a, and a low protruding wall 8e protruding to each inner side of the front end wall 8a and the intermediate wall 8b.

As illustrated in FIG. 7, the curved wall 8c is formed concentrically with the hole portion 12 of the board portion 7, and an inner surface of the curved wall 8c comes close to an outer surface of an annular outer peripheral wall 15 of the rotary member 5 with a slight gap. As illustrated in FIG. 6, a lower inner surface of the curved wall 8c is continuous with a right curved inner peripheral wall 16 which is raised from the board portion 7 in a low stepwise shape, and the inner peripheral wall 16 is continuous with the back sidewall 9 and is continuous with a right horizontal wall portion (one-step higher portion of the board portion 7) 17. A groove-like portion 18 having the upper surface of the board portion 7 as a bottom is formed between a vertical annular low outer peripheral surface 10a of the disc portion 10 and the back sidewall 9 being continuous with the inner peripheral wall 16 and the curved wall 8c. An inner peripheral surface of a lower end portion 15a of the outer peripheral wall 15 of the rotary member 5 comes close to the outer peripheral surface 10a of the disc portion 10 with a slight gap. The back sidewall 9 comes close to the outer peripheral wall 15 of the rotary member 5, but is not as much as the front sidewall 8.

A locking frame piece 19 with respect to the cover member 4 is provided at the upper outer surface of the front end wall 8a of the front sidewall 8. A right opening 20 (see FIG. 7) is formed between the back wall 8d and a right end of the back sidewall 9 to horizontally lead out a wire harness from the rotary member 5, and a left wide opening 22 (see FIG. 7) having approximately a fan shape is formed between the front end wall 8a and a left end of the back sidewall 9 to rotate a harness lead-out wall 21 (see FIG. 7) protruding toward a left side of the rotary member 5.

The back sidewall 9 has a low protruding wall 9a at a left end side of an inner surface thereof. Each of the front and back protruding walls 8e and 9a acts as a stopper for regulating a rotating angle of the rotary member 5. The cover member 4 is connected to an upper end of the back sidewall 9 through the thin hinge 23a. The base member 2 and the cover member 4 constitute a support body 3 with respect to the rotary member 5. In the following description, directions of front, back, right, left, up and down of the cover member 4 indicate directions when the cover member 4 is assembled to the base member 2.

The cover member 4 includes an upper wall portion 23 being in a horizontal state when assembled to the base member 2, a convex portion 24 protruding upward from the upper wall portion 23 and provided in a circular and annular shape, a circular outer peripheral wall 26 and a circular top wall 27 in a concave portion 25 formed inside the convex portion 24, a circular and cylindrical bearing wall 29 provided at a center of the concave portion 25 and supporting a shaft portion 28 having a circular cross-section on an upper center of the rotary member 5, and a circular and annular partition wall 30 provided on an inner surface of the top wall 27 and disposed concentrically outside the bearing wall 29.

An inner peripheral surface of the outer peripheral wall 26 of the concave portion 25 is provided to be concentric with the bearing wall 29 and the partition wall 30. An annular large-diameter groove portion 31 (see FIG. 7) is formed between the outer peripheral wall 26 and the partition wall 30, an annular medium-diameter groove portion 32 (see FIG. 7) is formed between the bearing wall 29 and the partition wall 30, and a non-penetration small diameter bore portion 29a (see FIG. 7) is formed inside the bearing wall 29. An upper half of the torsion coil spring 6 (see FIG. 7) is housed in the large-diameter groove portion 31, and the upper shaft portion 28 of the rotary member 5 is inserted into the bore portion 29a.

A slit-like cutout portion 33 (see FIG. 7) is provided on the partition wall 30, and a hook piece 33a is projected downward on one end side of the cutout portion 33 to hook an inward protruding end (not illustrated) on the upper end of the torsion coil spring 6. The inward protruding end on the upper end of the torsion coil spring 6 is housed in the inside groove portion 32 of the partition wall 30.

The concave portion 25 of the cover member 4 is disposed at a position (back half) closer to the thin hinge 23a of the upper wall 23, a long fixing wall portion 34 extends downward on the right side of the front half of the upper wall 23, a locking claw portion 35 is projected downward adjacent to the fixing wall portion 34, and an outer periphery of the upper wall 23, excluding a placement portion of the thin hinge 23a, the fixing wall portion 34, and the claw portion 35, is provided with a short vertical flange portion 36 projecting downward.

An inner surface of a vertical portion 34a of the fixing wall portion 34 is disposed to come in contact with the outer surface of the front sidewall 8 of the base member 2, a horizontal portion 34b is integrally provided at a lower end of the of the vertical portion 34a of the fixing wall portion 34, a hole portion 34c is provided in the horizontal portion 34b to insert a bolt or a locking clip, and the horizontal portion 34b is fastened together and firmly fixed to a vehicle body (not illustrated) with the bolt or the locking clip in a state where the hole portion 34c is overlapped with a hole portion (not illustrated) of the one-step higher board portion 17 on the right side of the base member 2. The claw portion (locking unit) 35 of the cover member 4 is engaged with a frame portion (locking means) 19 of the base member 2. For example, the shape of the locking unit can be appropriately set.

Figure 8:
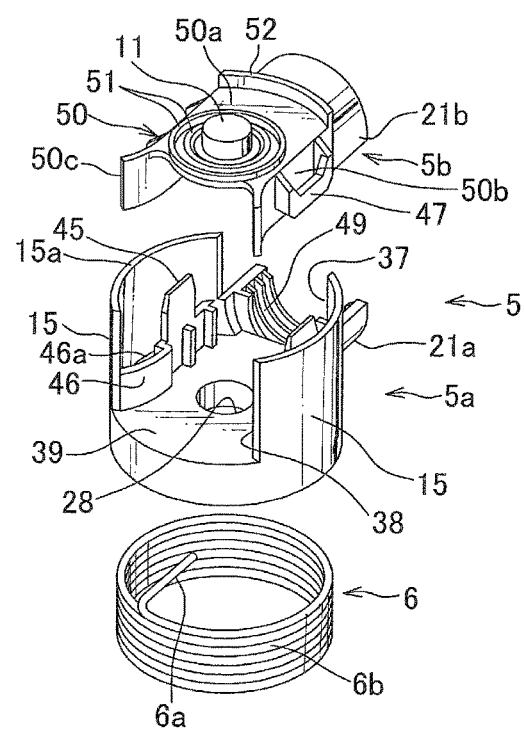
FIG. 8 is an exploded perspective view illustrating a state where a swing rotary member and a spring member for biasing the swing rotary member in the power supply device are vertically reversed.

As illustrated in FIGS. 6 and 7 and FIG. 8 (a vertically-reversed exploded perspective view), the rotary member 5 is made up of an upper main body portion (upper member) 5a and a lower sub-body portion (lower member) 5b, and the main body portion 5a includes a vertical circular and annular (an arc shape in part) outer peripheral wall 15 in which both left and right sides are cut and opened in a rectangular shape (cutout opening portions indicated by reference numerals 37 and 38 in FIG. 8), a circular horizontal upper wall 39 provided inside the upper portion of the outer peripheral wall 15, an upward shaft portion 28 provided at the center of the upper wall 39, a circular and annular partition wall 41 provided concentrically with the shaft portion 28 in the middle of the upper wall 39, and a semi-annular (semicircular cross-section) harness lead-out wall (holding wall) 21a projecting to the left in the upper portion of the left cutout opening 37.

The upper shaft portion 28 protrudes higher than the partition wall 41 or the outer peripheral wall 15. The partition wall 41 is provided with a slit-like cutout portion 41a for locking an inward protruding end 6a on the lower end of the torsion coil spring 6. The lower half of the torsion coil spring 6 is housed in a large diameter groove portion 42 (see FIG. 7) between the outer peripheral wall 15 and the partition wall 41, and the protruding end 6a on the lower end of the torsion coil spring 6 protrudes to an inner groove portion 43 (see FIG. 7) of the partition wall 41 from the cutout portion 41a. The upper shaft portion 28 is formed in two upper and lower steps of an upper-half small diameter portion 28a (see FIG. 7) and a lower-half large diameter portion 28b, the upper-half small diameter portion 28a is engaged with the bearing hole 29a of the cover member 4. A hole portion 44 (see FIG. 7) for drainage or the like is provided in a long hole shape on a part of the upper wall 39, which is a bottom wall of the large diameter groove portion 42, in a circumferential direction, and the hole portion 44 communicates with a lower space 46a (see FIG. 8) closer to the inner peripheral surface of the outer peripheral wall 15.

As illustrated in FIG. 8, an inner space of the upper shaft portion 28 is provided in a lower surface (inner surface) of the upper wall 39 in the main body portion 5a of the rotary member 5, a pair of front and back claw portions (locking unit) 45 for locking with respect to the lower sub-body portion 5b are projected downward in the inside of the front and back outer peripheral walls 15 of the rotary member 5, a pair of front and back curved walls 46 opened into an approximately truncated chevron shape are provided at a right side of each claw portion 45, and the lower end of the curved wall 46 is disposed so as to have the same height as the lower end of the left harness lead-out wall 21a having a half-split shape.

The claw portion 45 and the frame portion 47 serving as each of locking units (locking portion and locked portion) of the main body portion 5a and the sub-body portion 5b are disposed to be hidden inside the outer peripheral wall 15, so the appearance from the outside is improved. The hole portion 44 (see FIG. 7) for the drainage or the like on the upper wall 39 communicates with the space 46a between the curved wall 46 and the outer peripheral wall 15. A plurality of ribs 49 are provided in parallel on the inner peripheral surface of the harness lead-out wall 21a and are engaged with recessed portions (recessed grooves) on the outer periphery of a synthetic resin-made corrugated tube 48 (see FIGS. 5A and 5B).

As illustrated in FIG. 8, the sub-body portion 5b of the rotary member 5 is made up of a right-half portion (harness lead-out wall) 50 having approximately a U-shaped (gutter-like) cross-section and a left-half harness lead-out wall (holding wall) 21b having a semi-circular cross-section, the lower shaft portion 11 and two circular and annular concentric ribs (first rib) 51 around the shaft portion 11 are provided on the lower surface of a horizontal bottom wall 50a of the right-half portion 50, the locking frame portion (locking unit) 47 is provided on the outer surface of front and back sidewalls 50b and is engaged with the claw portion 45 of the main body portion 5a. The lower shaft portion 11 is rotatably (slidably) engaged with the hole portion 12 on the board portion 7 of the base member 2 (see FIG. 6), and two ribs 51 are rotatably engaged with the outside of each of the ribs 13 and 14 (second rib) of the disc portion 10 of the base member 2 as illustrated in FIGS. 9 and 10.

A curved wall 50c opened into approximately chevron shape on the right end side of the front and back sidewalls 50b of the sub-body portion 5b (see FIG. 8) is joined to the inner curved wall 46 of the main body portion 5a to form the other (toward a sliding door side) harness lead-out wall. In addition, a downward rib 52 of the large diameter arc shape is projected to a left end of the bottom wall 50a of the sub-body portion 5b, and the rib 52 is continuous with the lower end portion 15a of the front and back outer peripheral walls 15 of the main body portion 5a in a circular (arc shape) shape to form a part of the outer peripheral walls 15 and closely faces the outer peripheral surface 10a of the disc portion 10 of the base member 2 illustrated in FIG. 6 with a slight gap. Preferably, the arc-shaped ribs 102 and 103 and the upper flange wall 104 forming the labyrinth structure in FIG. 2 are also formed in the rib 52.

The torsion coil spring 6 in the present example includes a plurality of wound portions 6b (approximately, seven to eight loops) wound in a circular and spiral shape with no gap and protruding ends 6a protruding linearly inward from a lower-end wound portion and an upper-end wound portion, respectively, so that the wound portions 6b are twisted in a diameter reducing direction, thereby generating resilience-reaction force (spring force).

Figure 9:
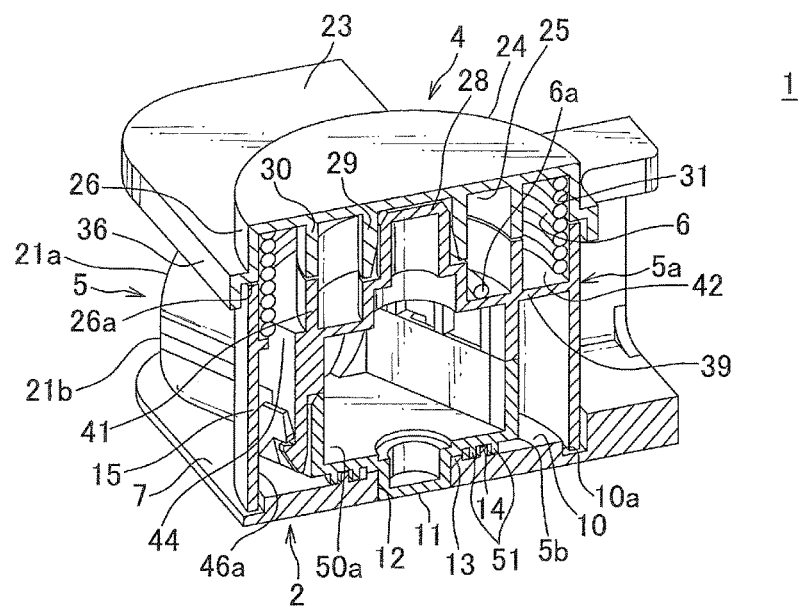
FIG. 9 is a perspective view illustrating an assembly state of the power supply device when viewed in an arrow direction by taking along the line A-A in FIG. 7.
Figure 10:
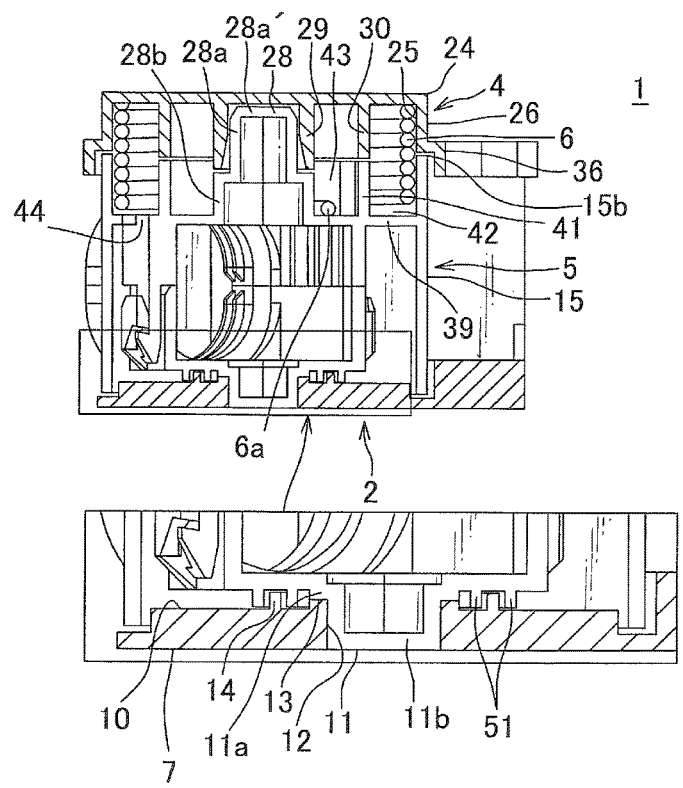
FIG. 10 is a cross-sectional view illustrating the assembly state of the power supply device when viewed in the arrow direction by taking along the line A-A (the inside of the frame illustrates an enlarged view), similarly.

As illustrated in FIGS. 9 and 10 (a diagram when viewed in an arrow A direction by taking along the line A-A in a state where the power supply device 1 illustrated in FIG. 7 is assembled), the rotary member 5 made up of the main body portion 5a and the sub-body portion 5b is swingably assembled between the base member 2 and the cover member 4, the lower half of the torsion coil spring 6 is housed in the annular groove portion 42 closer to the outer periphery on the upper portion of the rotary member 5 in a state the upper and lower protruding ends 6a of the torsion coil spring 6 are locked to the cover member 4 and the rotary member 5, and the upper half of the torsion coil spring 6 is housed in the annular groove portion 31 closer to the outer periphery of the cover member 4. One end of the corrugated tube 48 (see FIGS. 5A and 5B) for the wire harness is held between the harness lead-out walls 21a and 21b which are provided on the main body portion 5a and the sub-body portion 5b of the rotary member 5, respectively. The torsion coil spring 6 is covered with the cover member 4, so that foreign matters such as dust, sand, or water are prevented from adhering to the torsion coil spring from the outside and thus the torsion coil spring is securely protected.

The lower end (lower surface of the upper wall 23) 26a of the outer peripheral wall 26 of the convex portion 24 (portion having the concave portion 25 on the inside) protruding upward from the upper wall 23 of the cover member 4 comes close to the upper end of the outer peripheral wall 15 of the rotary member 5 with the slight gap (since the rotation of the rotary member 5 can be hindered when the contact is strong, weak contact may be acceptable) in the state where the cover member 4 is locked to the base member 2 with the locking units 19 and 35 (see FIG. 6) and, moreover, the inner surface of the downward flange portion 36 on the outer periphery of the upper wall 23 comes close to the outer surface on the upper end of the outer peripheral wall 15 of the rotary member 5 with the slight gap, so that the foreign matters are prevented from entering into the outward annular groove portion 42, that is, a spring housing space between the convex portion 24 of the cover member 4 and the rotary member 5 from above and sideways.

The torsion coil spring 6 is positioned closer to the inner peripheral surface between the outer peripheral wall 26 of the convex portion 24 in the cover member 4 and the outer peripheral wall 15 of the rotary member 5 in a free state, and the rotary member 5 is rotated in a back side of the vehicle (in a counterclockwise direction in FIG. 9) from that state, so that the torsion coil spring 6 is compressed (reduced in diameter) and thus generates forward resilience-reaction force.

Since the hole portion 44 is provided on the bottom wall (upper wall) 39 of the outward annular groove portion 42 in the rotary member 5 and the hole portion 44 communicates with the inner space 46a on the outer peripheral wall 15 of the rotary member 5 in the outside of the lower sub-body portion 5b, that is, the outside of the harness lead-out wall 50c (see FIG. 8), even when the foreign matters such as dust, sand, or water enter into the upper groove portion 42 as a spring housing space, the foreign matters are discharged to the outer board portion 7 through the disc portion 10 of the lower base member 2 from the hole portion 44 and the adhesion of the foreign matters to the torsion coil spring 6 is reliably prevented.

Since the annular ribs 13 and 14, which are disposed between two annular ribs 51 on the bottom wall 50a of the sub-body portion 5b in the rotary member 5 to closely face each other with the slight gap, are projected upward in the disc portion 10 of the base member 2 and a labyrinth structure having a longitudinal cross-section of a rectangular wave shape is formed by these ribs 13, 14, and 51, even when the foreign matters fall through the hole portion 44 of the upper wall 39 from the upper spring housing space 42, the entry of the foreign matters into the lower shaft portion 11 of the rotary member 5 is reliably prevented by the labyrinth structure and the foreign matters fall along the outer peripheral surface 10a of the disc portion 10 from the upper surface of the disc portion 10, thereby being discharged to the outside from the gap between the lower end of the outer peripheral wall 15 of the rotary member 5 and the upper surface of the board portion 7, and the sliding contact between the bearing hole 12 of the base member 2 and the lower shaft portion 11 of the rotary member 5 is constantly smoothly performed over a long period.

The labyrinth structure formed by these ribs 13, 14, and 51 prevents the foreign matters from riding over the disc portion 10 of the base member 2 from the lower end of the outer peripheral wall 15 of the rotary member 5 (the foreign matters hardly ride over the step 10a of the disc portion 10) and also prevents the foreign matters from reaching the lower shaft portion 11. The lower shaft portion 11 is continuous with an upper stepwise large-diameter portion (step portion) 11a (see FIG. 10), and the lower surface of the large diameter portion 11a slidably contacts with the upper surface of the annular rib 13 on the upper edge of the bearing hole 12 of the base member 2. Even though the bearing hole 12 of the base member 2 penetrates upward and downward, since a horizontal panel portion (not illustrated) of the vehicle body comes in closely contact with the lower side of the bearing hole 12 (the lower side of the board portion 7 of the base member 2), there is no concern that the foreign matters enter into the bearing hole 12 from the lower side.

As in the lower labyrinth structures 13, 14, and 51, an upper labyrinth structure is formed by the outer peripheral wall 26 of the convex portion 24 in the cover member 4, the downward flange portion 36 disposed outside the outer peripheral wall 26, the outward annular partition wall 30 disposed inside the outer peripheral wall 26 (in the concave portion 25), the annular (cylindrical) bearing wall 29 disposed inside the partition wall 30, the upper portion 15b of the outer peripheral wall 15 in the rotary member 5, the annular partition wall 41 disposed inside the upper portion of the outer peripheral wall 15, and the shaft portion 28 protruding upward higher than the partition wall 41 in the inside of the partition wall 41, that is, the large-diameter annular lower half (portion not slidably contacting with the inner peripheral surface of the bearing wall 29 in the cover member 4) 28b of the shaft portion 28. The outer peripheral wall 26, the partition wall 30, and the bearing wall 29 of the convex portion 24 in the cover member 4 are disposed concentrically with each other, and the outer peripheral wall 15, the partition wall 41, and the upper shaft portion 28 in the rotary member 5 are disposed concentrically with each other.

Although the upper shaft portion 28 is hollow similarly to the lower shaft portion 29, a tip of the small diameter upper half 28a of the upper shaft portion 28 is closed by an upper end wall 28a' (similarly, a tip of the lower shaft portion 11 is closed by a lower end wall 11b), and the outer peripheral surface of the upper half 28a on the upper shaft portion 28 is supported to come in slidably contact with the inner peripheral surface of the bearing wall 29 in the cover member 4. Each of the upper and lower shaft portions 11 and 28 can be a solid rather than the hollow.

In a case where the foreign matters enters into the outward annular groove portion (spring housing space or housing chamber) 42 on the inner side from the gap between the upper end 15b of the outer peripheral wall 15 in the rotary member 5 and the lower end of the outer peripheral wall 26 of the convex portion 24 in the cover member 4 and no hole portion 44 for discharging the foreign matters exists in the bottom wall 39 of the annular groove portion 42, since the upper and lower annular partition walls 30 and 41 are disposed at the inside between the outer peripheral wall 15 and the convex portion 24 and the inside between the outer peripheral wall 26 and the rotary member 5, respectively, to face each other with the slight gap, the foreign matters are prevented from entering to the inner annular groove portion 43 of the partition wall 41 by each of the upper and lower partition walls 30 and 41 and the foreign matters are prevented from adhering to the protruding end 6a on the lower end of the torsion coil spring 6 housed in the annular wall portion 43.

Even in a case where the foreign matters have already entered into the inner annular groove portion 43 of the partition wall 41, since the large-diameter lower half 28b of the upward shaft portion 28 is not engaged with the inside of the bearing wall 29 in the cover member 4, there is no problem when the foreign matters adhere to the lower half 28b of the shaft portion 28 and since the bearing wall 29 of the cover member 4 faces the upper side of the large-diameter lower half 28b with the slight gap, the entry of the foreign matters into the small-diameter upper half 28a (between the upper half 28a of the shaft portion 28 and the bearing wall 29) of the shaft portion 28 is prevented by the bearing wall 29. Thus, the upper half 28a of the shaft portion 28 smoothly and reliably rotates in the circumferential direction while coming in slidably contact with the inside of the bearing wall 29 over a long period without being affected by the foreign matters, and the swing operation of the rotary member 5 is smoothly and reliably performed over a long period.

Furthermore, in a case where abrasion powders of synthetic resin are caused by the abrasion due to the sliding contact between the upper shaft portion 28 of the rotary member 5 and the bearing wall 29 of the cover member 4 over a long period, since the upper and lower annular partition walls 30 and 41 are provided between the shaft portion 28 and the torsion coil spring 6 and the bearing wall 29 and the torsion coil spring 6, respectively, and the lower end surface of the upper partition wall 30 (in the cover member 4) and the upper end surface of the lower partition wall 41 (in the rotary member 5) come in contact with each other (come close to each other or weakly contact with each other), the adhesion of the abrasion powders to the torsion coil spring 6 is prevented by the upper and lower partition walls 30 and 41.

Similarly to the power supply device 1' in FIG. 1, even in the power supply device 1 illustrated in FIGS. 6 to 10, as illustrated in the right side of FIG. 4 and FIG. 5A, when the sliding door 54 is fully closed, the torsion coil spring (spring member) 6 of the power supply device 1 on the vehicle body side is provided integrally with the rotary member 5 to bias the wire harness (substituted by reference numeral 48) in a clockwise direction (in a closing direction of the sliding door and toward the inside of the vehicle body 53) as indicated by an arrow F1, so that the wire harness 48 is forward pulled and extends toward the power supply device 55 on the sliding door side in a state of an approximate straight line along the vehicle body 53 without protruding to the outside (sliding door side) from the vehicle body 53.

Then, as illustrated in the center of FIG. 4, when the sliding door 54 is half-opened, the wire harness 48 is biased by the torsion coil spring 6 of the power supply device 1 on the vehicle body side in the closing direction of the sliding door and toward the inside of the vehicle as indicated by the arrow F1, so that the wire harness is smoothly bent in a substantial S-shape without being buckled and an excessive length of the harness is absorbed.

Furthermore, as illustrated in the left side of FIGS. 4 and 5B, when the sliding door 54 is fully opened, the torsion coil spring 6 of the power supply device 1 on the vehicle body side is provided integrally with the rotary member 5 to bias the wire harness 48 in the closing direction of the sliding door as indicated by an arrow F1, so that the wire harness portion 48 led out from the power supply device 1 on the vehicle body side is separated forward from a portion (a portion protruding toward the outside of the vehicle) 53b on the back end side of the entrance 53a of the vehicle body 53 and thus is prevented from the interference with the protruding portion 53b on the back end side of the entrance of the vehicle body 53.

As illustrated in FIG. 5B, since the electric wire portion of the wire harness 48 is inserted and housed into/in the outer peripheral wall 15 of the rotary member 5 in the power supply device 1, the appearance from the outside is excellent, and since the gap 57 between the outer peripheral wall 15 of the rotary member 5 and the front sidewall 8 of the base member 2 is suppressed small, there is no concern that the foreign matters enter into the gap 57.

FIGS. 11 to 14 illustrate a power supply device on a sliding door side as a power supply device according to a third embodiment of the present invention.

Figure 11:
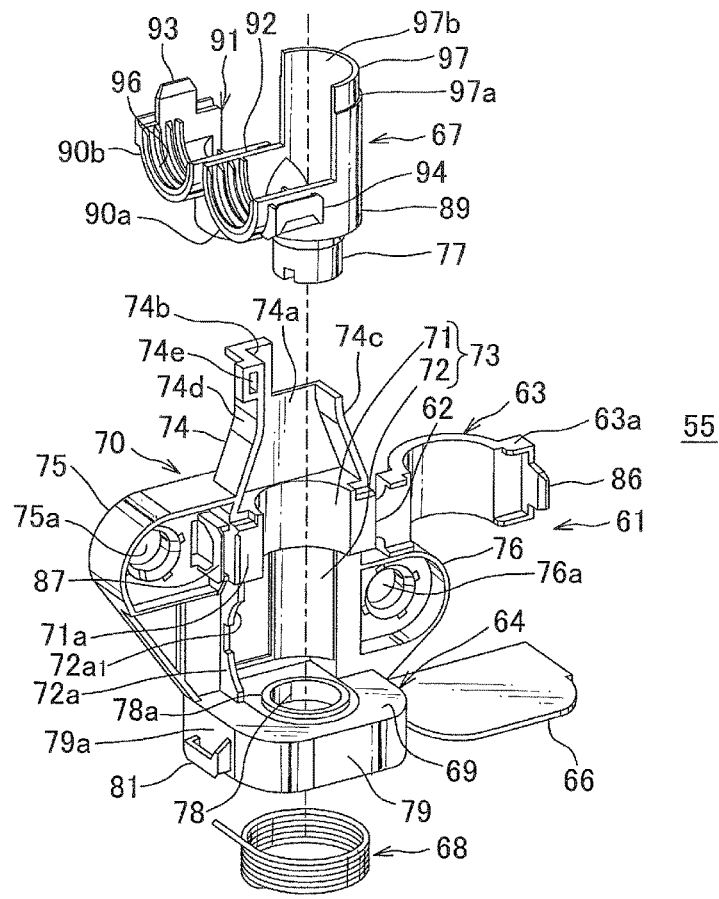
FIG. 11 illustrates a power supply device according to a third embodiment of the present invention and is an exploded perspective view illustrating the power supply device on a sliding door side.
Figure 12:
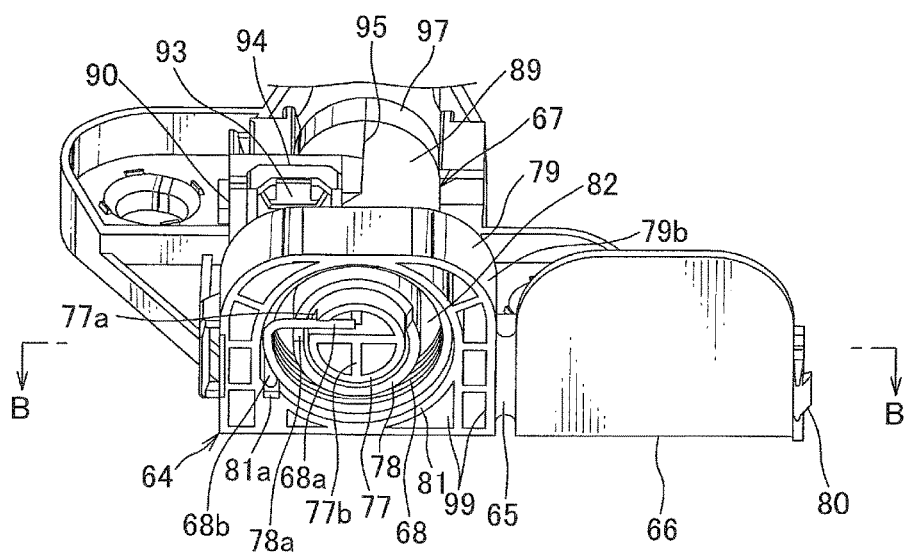
FIG. 12 is a perspective view illustrating a state in the middle of assembly of the power supply device when viewed from below, similarly.

As illustrated in FIGS. 11 and 12, a power supply device 55 includes a longitudinal synthetic resin-made base member 70, a side cover (holding member) 63 which is openably and closably connected to an upper side of the base member 70 with a thin hinge 62 in a horizontal (forward and backward) direction, a cover member 64 on a synthetic resin-made hollow bottom side provided integrally with a lower side of the base member 70, a synthetic resin-made lower cover 66 which is openably and closably connected to the cover member 64 with a thin hinge (hinge) 65 in an up-down direction and covers a lower opening 99 (see FIG. 12) of the cover member 64, a synthetic resin-made rotary member 67 which is assembled to the base member 70 and the cover member 64 and thus is rotatably held in the side cover 63 in the horizontal direction, and a metallic annular torsion coil spring (spring member or spring portion) 68 which is mounted in the cover member 64 and thus is covered from the lower side and protected by the lower cover 66.

The base member 70 includes a semi-annular portion 73 of a semi-circular cross-section provided integrally at the center in a width direction, a harness lead-out portion 74 of a rectangular cross-section provided integrally at the upper side of the semi-annular portion 73 and gradually reduced in width in an upward tapered shape, and fixing portions 75 and 76 provided integrally at both front and back sides of the semi-annular portion 73. The bottom cover member 64, that is, a spring housing portion has an upper horizontal board portion 69, and the base member 70 is integrally erected on a left end side of the board portion 69. A support body 61 is configured to support the rotary member 67 with the base member 70 and the cover member 64 orthogonal to the base member 70 from the side and the below. The support body 61 is referred to as a base member, and the base member 70 can be also referred to as an erected wall with respect to the cover member 64.

A cylindrical bearing wall 78 of a circular cross-section vertically penetrates into the center of the approximately rectangular board portion 69 of the bottom cover member (spring housing portion) 64 and is thus provided integrally therewith to rotatably support a lower shaft portion 77 of the rotary member 67, and a circular annular rib (second rib) 78a on an upper end of the bearing wall 78 is projected upward from the upper surface of the board portion 69. A lower end of the bearing wall 78 is positioned at the same horizontal plane as a lower end of a vertical outer peripheral wall 79 of the bottom cover member 64. A frame piece 81 is provided on an outer surface of the back sidewall 79a of the outer peripheral wall 79 in the cover member 64 and is engaged with a locking claw portion 80 (see FIG. 12) on one side end of the lower cover 66. For example, the shape of these locking units 80 and 81 can be appropriately set.

Figure 13:
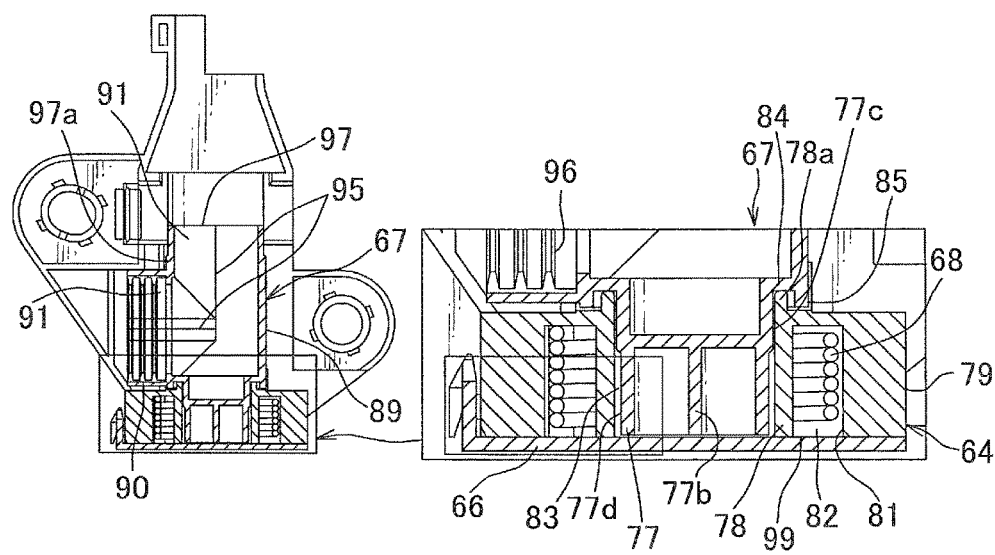
FIG. 13 is a cross-sectional view illustrating the assembly state of the power supply device when viewed in the arrow direction by taking along the line B-B in FIG. 12 (the inside of the frame illustrates an enlarged view).

As illustrated in FIGS. 12 and 13, an annular partition wall 81 is provided concentrically with the outside of the cylindrical bearing wall 78 inside the bottom cover member (spring housing portion) 64, a torsion coil spring 68 is housed in an annular downward groove portion (vacant chamber) 82 between the bearing wall 78 and the partition wall 81, a wide cutout portion 78a is provided in the bearing wall 78 to lock an inward protruding end 67a on the lower end of the torsion coil spring 68, a slit-like groove 81a is provided in a tangential direction of the partition wall 81 to lock an outward protruding end 68b on the upper end of the torsion coil spring 68, and a slit-like cutout portion 77a is provided in the lower shaft portion 77 of the rotary member 67 to lock an inward protruding end 68a on the lower end of the torsion coil spring 68.

The lower shaft portion 77 of the rotary member 67 includes a hollow cylindrical portion (substituted by reference numeral 77) and a reinforcing rib 77b formed in the cylindrical portion with a cross shape. A circular wound portions of the torsion coil spring 68 is disposed along the inner peripheral surface of the partition wall 81, the rotary member 67 is backward (in a clockwise direction in FIG. 11) biased by force of the torsion coil spring 68, and the torsion coil spring 68 is reduced in diameter against the spring force as the rotary member 67 rotates forward (in a counterclockwise direction in FIG. 11).

The lower cover 66 of the bottom cover member 64 is connected to a lower end of a front sidewall 79b of the outer peripheral wall 79 in the cover member 64 with a thin hinge 65 and is formed to have the same size and shape as the lower end of the outer peripheral wall 79, so that the shaft portion 77, the bearing wall 78, the partition wall 81, or the torsion coil spring 68 is completely covered by the cover member 64 in the closed state of the lower cover 66, thereby preventing the entry of foreign matters such as dust, sand, or water from outside (lower side).

Figure 14:
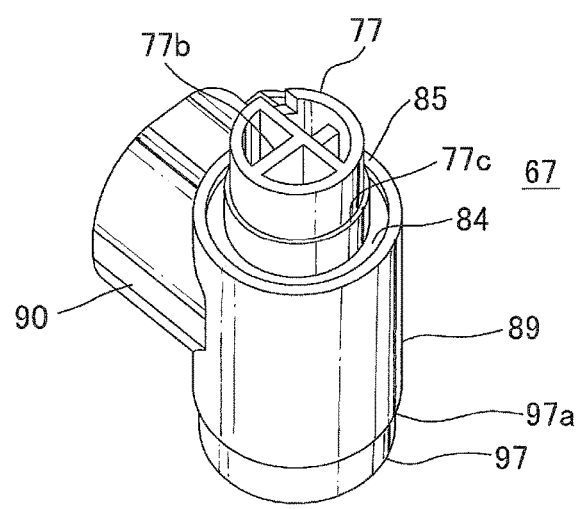
FIG. 14 is a perspective view illustrating a state where a rotary member of the power supply device is vertically reversed.

As illustrated in FIG. 13, a slightly large-diameter outer peripheral surface 77c on an upper half of the lower shaft portion 77 of the rotary member 67 come in rotatably and slidably contact with an upper half of the inner peripheral surface of the cylindrical bearing wall 78 in the cover member 64, and a gap 83 is formed between the inner peripheral surface on a lower half of the bearing wall 78 and a slightly small diameter outer peripheral surface 77d on a lower half of the shaft portion 77. As illustrated in FIGS. 13 and 14, the large-diameter upper half 77c of the lower shaft portion 77 is orthogonal to an annular narrow bottom wall 84 of the rotary member 67, an annular rib (first rib) 85 is projected concentrically with the shaft portion 77 on a lower surface of the bottom wall 84, a tip (upper end) of the annular rib 78a on the upper end of the bearing wall 78 comes in rotatably and slidably contact with the lower surface of the annular bottom wall 84 in the rotary member 67, the downward annular rib 85 of the bottom wall 84 is positioned closer to the outside of the upward annular rib 78a of the bearing wall 78, and both of the annular ribs 78a and 85 constitute a labyrinth structure, thereby preventing the entry of the foreign matters into the outer peripheral surface of the lower shaft portion 77.

Even in a case where the foreign matters enter toward the outer peripheral surface of the shaft portion 77 by riding over the upward rib 78a of the bearing wall 78, the foreign matters fall into the gap 83 between the inner surface of the bearing wall 78 and the small diameter outer peripheral surface 77d on the lower half of the shaft portion 77 and are housed therein, so that there is no concern that the foreign matters adversely affect the large diameter sliding contact surface 77c on the upper half of the shaft portion 77. In addition, in this case, since the lower end of the bearing wall 78 and the upper surface of the lower cover 66 come in closely contact with each other, the entry of the foreign matters into the outside of the bearing wall 78, that is, the groove portion 82 serving as a spring housing space is also prevented.

As illustrated in FIG. 11, the semi-annular portion 73 positioned at the center in the width direction of the base member 70 is made up of a lower-half curved wall portion 72 formed longer in the up-down direction and an upper-half curved wall portion 71 formed shorter in the up-down direction, and the semi-annular side cover (holding member) 63 is openably and closably connected to one side end (front end) of the upper-half curved wall portion 71 with the thin hinge 62. The longitudinal cylindrical wall portion (outer peripheral wall) 89 of the rotary member 67 comes in contact (slidably contact) with the semi-annular portion 73 of the base member 70 formed with the upper and lower curved wall portions 71 and 72 without any gap, so that the entry of the relatively large foreign matters such as stone or pen or the entry of the small foreign matters such as sand is prevented between the cylindrical wall portion 89 and the semi-annular portion 73 of the base member. The locking claw portion 86 is provided on a rotating tip side of the side cover 63 and the frame piece 87 is provided closer to the fixing portion 75 on the back side of the base member 70 and is engaged with the claw portion 86. For example, the shape of these locking units 86 and 87 can be appropriately set.

Positioning and backlash preventing flange portions 63a are provided up and down on front and back ends of the side cover 63 and are engaged with upper and lower ends of front and back wall portions 71a having a block shape of the upper semi-annular portion 71. On a back end of the lower semi-annular portion 72, a side wall 72a is formed to come in closely contact with a transverse harness lead-out wall (harness lead-out portion) 90 of the rotary member 67 at a backward rotating end position to stop and is formed such that the outer peripheral surface of the longitudinal cylindrical wall portion (outer peripheral wall) 89 comes in contact with or comes close to an inner end $72a_1$ with a slight gap. The side cover 63 or the lower cover 66 can be formed separately from the base member 70 or the cover member 64 (in this case, however, it is an undeniable fact that assemblability of the power supply device 55 deteriorates).

A back fixing portion (bracket portion) 75 of the base member 70 has a fixing hole portion 75a on an upper side thereof into which bolts or locking clips are inserted, and a front fixing portion (bracket portion) 76 is disposed at a lower side of the side cover 63 in the opened state and has a fixing hole portion 76a, similarly.

A harness lead-out portion (lead-out wall) 74 on a center upper portion of the base member 70 is made up of a vertical rear wall 74a and front and back sidewalls 74c and 74d which are orthogonal to the rear wall 74a and by which the upper portion opening 74b is reduced in width with an approximately truncated chevron shape, a fixing hole (harness fixing portion) 74e is provided at an upper portion of the back sidewall 74d to fix an upward electric wire portion 88 (see FIG. 15) of the wire harness with a binding band or the like, the front sidewall 74c is cut out low together with the rear wall 74a. A plurality of reinforcing ribs (not illustrated) are vertically and horizontally provided on a rear side (left end surface) of the base member 70.

As illustrated in FIGS. 11 to 14, the rotary member 67 includes a cylindrical wall portion (outer peripheral wall) 89 having a longitudinally circular cross-section and a cylindrical wall portion (harness lead-out portion) 90 having a transversely circular cross-section which is orthogonal to the middle portion of the cylindrical wall portion 89 in a height direction, a left-half upper portion of the longitudinally cylindrical wall portion 89 and an upper half of the transversely cylindrical wall portion 90 are formed as a cylindrical wall portion 91 having a half-split shape, which is bent in an L shape, to enhance insertion workability of the wire harness, half-split lower half 90a and upper half 90b forming the transversely cylindrical wall portion 90 are openably and closably connected to each other with a thin hinge 92 on one side, a locking claw portion 93 is provided on the other side of the upper half 90b, and a frame piece 94 is provided on the other side of the lower half 90a and is engaged with the claw portion 93. The configuration of these locking units (locking portion and locked portion) such as the claw portion 93 and the frame piece 94 can be appropriately set.

In FIGS. 12 and 13, a split surface (joint surface) of the cylindrical wall portions 89 and 90 having the half-split shape is indicated by reference numeral 95. As illustrated in FIGS. 11 and 13, a plurality of ribs 96 are projected in parallel on the inner peripheral surface on the protruding end side of the transversely cylindrical wall portion 90 to hold the end (the other end) of a corrugated tube 48 (see FIG. 15) of the wire harness.

The lower small-diameter shaft portion 77 is formed integrally with the bottom of the longitudinally cylindrical wall portion 89 at a side lower than the transversely cylindrical wall portion 90. As illustrated in FIG. 14, the lower shaft portion 77 is orthogonal to the circular horizontal bottom wall 84 of the longitudinally cylindrical wall portion 89, an annular rib 85 for a labyrinth is provided on a peripheral edge of the bottom wall 84, and an annular groove (substituted by reference numeral 84) is formed between the annular rib 85 and the shaft portion 77 such that the upward annular rib 78a of the cover member 64 is slidably engaged therewith.

The outer peripheral surface on the upper portion of the longitudinally cylindrical wall portion 89 is formed to have a slightly small diameter, thereby constituting an upper hollow shaft portion 97. A step portion 97a is formed between the small-diameter outer peripheral surface of the upper shaft portion 97 and the large diameter outer peripheral surface of the longitudinally cylindrical wall portion 89, the outer peripheral surface of the upper shaft portion 97 is rotatably supported in the inner surface of the semi-annular upper wall 71 of the base member 70 and the inner surface of the side cover 73 illustrated in FIG. 11. The upper shaft portion 97 is formed shorter to enhance the sliding contact property in the circumferential direction.

Figure 15:
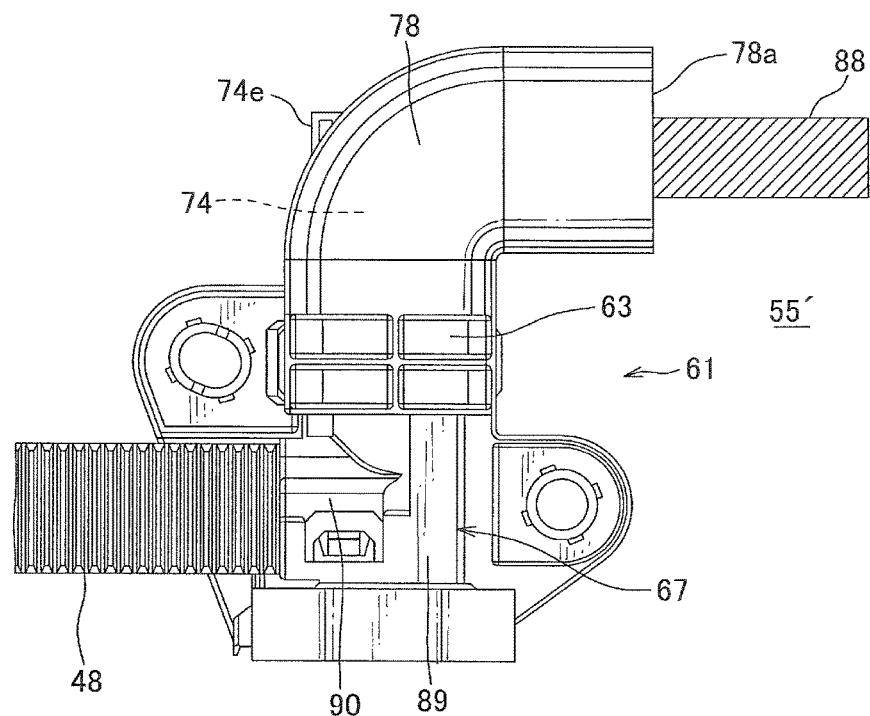
FIG. 15 is a front view illustrating a preferred modification example of an upper portion of the power supply device.

As illustrated in FIG. 15, a tube portion 78 bent in an L shape is formed integrally with the upper harness lead-out portion 74 of the base member 70, which preferably prevents the entry of the foreign matters from above. In this case, the left and right half-split tube portions 78 bent in the L shape are provided integrally with the harness lead-out portion 74 and the side cover 63 illustrated in FIG. 11, respectively, the rotary member 67 is rotatably held between the side cover and the center curved wall 71 (see FIG. 11) of the base member 70 in the horizontal direction when the side cover 63 (right half-split tube portion 78) is closed, the left and right half-split tube portions 78 are joined to each other, thereby forming the L-shaped tube portion 78, and a plurality of electric wires 88 of the wire harness led out from an upper opening 97b (see FIG. 11) of the rotary member 67 are arranged in the L-shaped tube portion 78 and are thus bent in the horizontal direction, thereby being led into the sliding door from an opening 78a on a front end (alternatively, back end) of the L-shaped tube portion 78.

In FIG. 15, an end of the corrugated tube 48 for the wire harness is held in the transverse harness lead-out portion 90 on a side of the rotary member 67. The corrugated tube 48 is biased toward the back side of the vehicle by the torsion coil spring 68 together with the rotary member 67 in a free state. A power supply device is indicated by reference numeral 55' in FIG. 15.

As illustrated in the right of FIG. 4, when the sliding door 54 is fully closed, the torsion coil spring 68 of the power supply device 55 on the sliding door side biases the wire harness 48 toward the outside (sliding door side) of the vehicle together with the rotary member 67, so that the wire harness 48 is smoothly and reliably bent in a substantially S-shape without being buckled when sliding door 54 is half-opened as illustrated in the center of FIG. 4 from the fully closed state. Similarly, as illustrated in the left of FIG. 4, when the sliding door 54 is fully opened, the torsion coil spring 68 of the power supply devices 55 on the sliding door side biases the wire harness 48 toward the rear side of the vehicle together with the rotary member 67, so that the wire harness 54 is smoothly and reliably bent in a substantially S-shape without being buckled when sliding door 54 is half-opened as illustrated in the center of FIG. 4 from the fully opened state.

Figure 16:
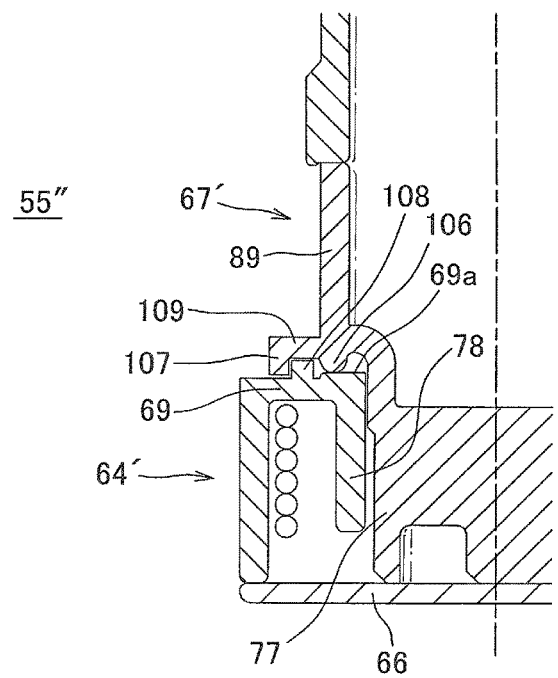
FIG. 16 is a longitudinal cross-sectional view illustrating a modification example of a lower labyrinth structure of the power supply device.

FIG. 16 is a diagram illustrating another form of a lower labyrinth structure in a power supply device 55" on the sliding door side. The labyrinth structure is similar to the lower labyrinth structure in the power supply device 1' on the vehicle body side illustrated in FIG. 2 and is a labyrinth structure having a cross-section of a rectangular wave shape with inner/outer ribs 106 and 107 and a central rib 108. In the labyrinth structure, the inner annular rib 106 and the outer annular rib 107 are provided downward on a lower end side of a longitudinal cylindrical wall portion (outer peripheral wall) 89 having a circular cross-section of a rotary member 67' and the upward annular rib 108 (second rib) is provided on a horizontal board portion 69 of a lower cover member 64' and is engaged with an annular groove portion between the inner/outer ribs 106 and 107 (first rib).

The inner rib 106 is formed in a substantially semicircular shape in cross-section and slidably contacts with the cover member 64' together with a lower shaft portion 77 of the rotary member 67 (the lower shaft portion 77 slidably contacts with an inner surface of a bearing wall 78 and the inner rib 106 slidably contacts with a seat surface 69a on a flat upper edge of the bearing wall 78), so that the rotary member 67' is rotatably supported in a stable manner. The inner rib 106 is a lower end portion (a part) of the cylindrical wall portion 89, and the outer rib 107 is suspended from an annular flange wall 109 protruding outward from the cylindrical wall portion 89. Each of the ribs 106 to 108 and the flange wall 109 do not come in contact with each other and come close to each other with a slight gap, so that the rotary member 67' smoothly rotates with a low frictional resistance.

Further, in the above-described embodiments, the power supply devices 1 and 1' illustrated in FIGS. 1 to 3 or FIGS. 6 to 10 can be mounted on the sliding door 54 side, and the power supply device 55 illustrated in FIGS. 11 to 15 can be mounted on the vehicle body 53 side. Even in this case, since the outer peripheral surface of the cylindrical wall portion (outer peripheral wall) 89 of the rotary member 67 in the power supply device 55 illustrated in FIGS. 11 to 15 comes in contact with or comes close to an inner end $72a_1$ of the side wall 72a, which is a front side of the lower curved wall 72 of the base member 70, when the sliding door 54 is fully opened, the entry or nipping of the foreign matters such as stone, pen, or sand is prevented between the base member 70 and the rotary member 67 when the sliding door is fully opened or the decrease in visual appearance between the base member 70 and the rotary member 67 is prevented. An electric wire portion 88 of the wire harness is lead out from the upper portion of the rotary member 67 in a transverse direction by the L-shaped tube portion 78 as illustrated in FIG. 15 and is preferably arranged on the vehicle body side.

Further, in each of the above-described embodiments in FIG. 2 (FIG. 1) and FIG. 6, each of the ribs 56, 102, and 103 on the outer peripheral side illustrated in FIG. 2 can be added to the power supply device 1' illustrated in FIG. 6 as the lower labyrinth structure or each of the ribs 13 and 14 on the inner side (close to the shaft portion) illustrated in FIG. 6 can be also added to the power supply device 1 illustrated in FIG. 2 (FIG. 1).

Furthermore, in each of the above-described embodiments, an exterior member such as other resin tubes having good bendability can be used instead of the corrugated tube 48 or a plurality of electric wires can be bound to be used without using a protective tube such as the corrugated tube, and, in this case, the end of the wire harness is sandwiched and held in the harness lead-out portion 21 of the rotary member 5 and the harness lead-out portion 90 of the rotary member 55.

Furthermore, in each of the above-described embodiments, the rotary members 5 and 67 are biased in any one of swing direction using the annular torsion coil springs (spring members) 6 and 68, but the wire harness 48 can be naturally bent by opening/closing operation of the sliding door 54 without using the torsion coil springs 6 and 68. In this case, each of the cover members 4 and 64 does not require the spring housing portion and thus is simplified.

Although the above-described embodiments describe the case where the power supply devices 1 and 1' are mounted on the vehicle body 53 of the automobile and the case where the power supply device 55 is mounted on the sliding door 54 of the automobile, respectively, as an example, these power supply devices 1, 1', and 55 can be applied to a sliding door for vehicles other than the automobile or a sliding door, a slide member, or the like for apparatuses other than the vehicles, for example. The vehicle body 53, an apparatus body, or the like is collectively referred to as a fixed structure body and the sliding door 54, the slide member, or the like is collectively referred to as a sliding structure body.

INDUSTRIAL APPLICABILITY

The power supply device according to the present invention is provided with the support member fixed to the sliding door side or the vehicle body side and the rotary member swingably and pivotally supported on the support member, and thus it is possible to prevent the nipping of the foreign matters such as stone, pen, or sand between the support member and the rotary member and to further prevent the foreign matters such as dust, sand, or water from entering to the pivotally support lower portion of the rotary member from the outside without impairing the appearance when, for example, the sliding door is fully opened.

REFERENCE SIGNS LIST

1, 1', 55, 55": power supply device
3, 3', 61: support member
5, 5', 67: rotary member
5b, 5b': sub-body portion
8, 8', 72a: one sidewall
11, 77: lower shaft portion (pivotally supported portion)
13, 14, 56, 78a, 108: second rib
15: outer peripheral wall
21, 90: harness lead-out wall (harness lead-out portion)
45, 47: locking means
48: corrugated tube (wire harness)
51, 85, 102, 103, 106, 107: first rib
53: vehicle body (fixed structure body)
54: sliding door (sliding structure body)
89: cylindrical wall portion (outer peripheral wall)

The invention claimed is:

1. A power supply device comprising:
a rotary member that holds a wire harness inserted therethrough; and
a support member that swingably supports the rotary member and is fixed to a fixed structure body allowing a sliding structure body to slide thereto, or a sliding structure body sliding to a fixed structure body,
wherein the rotary member has a cylindrical outer peripheral wall with a center axis in agreement with a central shaft portion of the rotary member, and a harness lead-out portion, the support member has one sidewall curved concentrically with the outer peripheral wall located along the outer peripheral wall, and the harness lead-out portion moves in a direction away from the sidewall when the sliding structure body is fully opened, the outer peripheral wall is exposed between the harness lead-out portion and the sidewall, the outer peripheral wall and the sidewall are overlapped with each other in a plate thickness direction in a state where the outer peripheral wall is exposed, and are adjacent to or come in contact with each other so that foreign matters are prevented from entering between the outer peripheral wall and the sidewall.

2. The power supply device according to claim 1, wherein
at least two first annular ribs are provided having an annular groove portion between the annular ribs on a lower end side of the rotary member, and
a second annular rib is provided in the support member to engage the annular groove portion as a labyrinth structure so as to prevent the entry of the foreign matters.

3. The power supply device according to claim 2, wherein the first and second ribs are disposed around a lower pivotally supported portion of the rotary member.

4. The power supply device according to claim 1, wherein the rotary member includes an upper main body portion and a lower sub-body portion,
the upper main body portion includes the outer peripheral wall and a first harness lead-out wall having a half-split shape and constituting a part of the harness lead-out portion,
the lower sub-body portion includes a second harness lead-out wall having a half split shape and being jointed to the first lead-out wall to form the harness lead-out portion and a third harness lead-out wall located inside the outer peripheral wall.

5. The power supply device according to claim 3,
wherein the rotary member includes an upper main body portion and a lower sub-body portion,
the upper main body portion includes the outer peripheral wall and a first harness lead-out wall having a half-split shape and constituting a part of the harness lead-out portion,
the lower sub-body portion includes a second harness lead-out wall having a half split shape and being jointed to the first lead-out wall to form the harness lead-out portion and a third harness lead-out wall located inside the outer peripheral wall.

6. The power supply device according to claim 3,
wherein the rotary member includes an upper main body portion and a lower sub-body portion,
the upper main body portion includes the outer peripheral wall and a first harness lead-out wall having a half-split shape and constituting a part of the harness lead-out portion,
the lower sub-body portion includes a second harness lead-out wall having a half split shape and being jointed to the first lead-out wall to form the harness lead-out portion and a third harness lead-out wall located inside the outer peripheral wall.

7. The power supply device according to claim 4,
wherein the upper main body includes a claw portion, the lower sub-body portion includes an opening, and wherein the claw portion is inserted into the opening so that the lower sub-body portion is attached to the upper main body portion.

8. The power supply device according to claim 5,
wherein the upper main body includes a claw portion, the lower sub-body portion includes an opening, and
wherein the claw portion is inserted into the opening so that the lower sub-body portion is attached to the upper main body portion.

9. The power supply device according to claim 6,
wherein the upper main body includes a claw portion, the lower sub-body portion includes an opening, and
wherein the claw portion is inserted into the opening so that the lower sub-body portion is attached to the upper main body portion.

\* \* \* \* \*